United States Patent
Hu et al.

(10) Patent No.: US 9,921,324 B2
(45) Date of Patent: Mar. 20, 2018

(54) SYSTEMS AND METHODS EMPLOYING UPWARD BEAM PROPAGATION FOR TARGET-ORIENTED SEISMIC IMAGING

(71) Applicants: Chaoshun Hu, Houston, TX (US); Uwe Karsten Albertin, Houston, TX (US)

(72) Inventors: Chaoshun Hu, Houston, TX (US); Uwe Karsten Albertin, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 382 days.

(21) Appl. No.: 14/644,538

(22) Filed: Mar. 11, 2015

(65) Prior Publication Data

US 2016/0266266 A1     Sep. 15, 2016

Related U.S. Application Data (60) Provisional application No. 62/036,910, filed on Aug. 13, 2014.

(51) Int. Cl.
*G01V 1/28* (2006.01)
*G01V 1/36* (2006.01)

(52) U.S. Cl.
CPC ........... *G01V 1/282* (2013.01); *G01V 1/28* (2013.01); *G01V 1/364* (2013.01); *G01V 2210/32* (2013.01)

(58) Field of Classification Search
CPC ........... G01V 1/282; G01V 2210/51; G01V 2210/679; G01V 2210/67
See application file for complete search history.

(56) References Cited

U.S. PATENT DOCUMENTS

| | | | |
|---|---|---|---|
| 4,964,103 A * | 10/1990 | Johnson | G01V 1/301 367/50 |
| 4,992,996 A | 2/1991 | Wang et al. | |
| 8,116,168 B1 | 2/2012 | Luo et al. | |
| 8,179,740 B2 | 5/2012 | Sainger et al. | |

(Continued)

OTHER PUBLICATIONS

PCT International Preliminary Report on Patentability, International Application No. PCT/US2015/019962, dated Feb. 23, 2017, pp. 1-10.

(Continued)

*Primary Examiner* — Ian J Lobo
(74) *Attorney, Agent, or Firm* — Daniel Krueger; Marie L. Clapp (57) ABSTRACT

A system and method for performing a target-oriented reverse time migration may include obtaining a seismic dataset and a geologic model representative of the subsurface volume of interest; identifying a target based on the seismic dataset and the geologic model; calculating a normal to represent a structural dip direction for at least one point on the target; upward propagating a cluster of beams from the at least one point on the target to a surface representing an acquisition surface of the seismic data; identifying valid source-receiver beam pairs based on coverage of the seismic dataset; accumulating coverage of the valid source-receiver beam pairs; identifying traces from the seismic dataset that fall within the accumulated beam pair coverage; and performing a target-oriented reverse time migration using the identified traces to produce a seismic image.

14 Claims, 5 Drawing Sheets

(56) References Cited

U.S. PATENT DOCUMENTS

| | | | |
|---|---|---|---|
| 8,275,550 B2 | 9/2012 | Wei et al. | |
| 8,537,638 B2 | 9/2013 | Lee et al. | |
| 8,612,156 B2 | 12/2013 | Sandeep | |
| 8,619,498 B2 | 12/2013 | Xu et al. | |
| 8,688,381 B2 | 4/2014 | Routh et al. | |
| 2005/0143921 A1* | 6/2005 | Winbow | G01V 99/00 702/14 |
| 2006/0056272 A1* | 3/2006 | Hill | G01V 1/282 367/73 |
| 2009/0132170 A1 | 5/2009 | Krueger et al. | |
| 2011/0103185 A1 | 5/2011 | Hill et al. | |
| 2012/0010820 A1 | 1/2012 | Winbow et al. | |
| 2012/0140593 A1 | 6/2012 | Stoffa et al. | |
| 2012/0221248 A1 | 8/2012 | Yarman et al. | |
| 2012/0265445 A1 | 10/2012 | Zhang et al. | |
| 2013/0003500 A1 | 1/2013 | Neelamani et al. | |
| 2013/0077439 A1 | 3/2013 | Eick et al. | |
| 2013/0077440 A1 | 3/2013 | Cao et al. | |
| 2013/0215717 A1 | 8/2013 | Hofland et al. | |
| 2013/0265851 A1 | 10/2013 | Faber et al. | |
| 2013/0279293 A1 | 10/2013 | Xu et al. | |
| 2013/0311149 A1 | 11/2013 | Tang et al. | |

OTHER PUBLICATIONS

Lapilli-2010 Wave Equation Illumination WesternGeco C M Lapilli, a Gonzales, D Nichols, J P Perdomo 2010.

Popov-2008 Reverse Time Migration with Gaussian Beams and Velocity Analysis Applications M.M. Popov, N.M. Semtchenok, P.M. Popov and A.R. Verdel 2008.

Yang-2008 Target Oriented Full-wave Equation Based Illumination Analysis Hui Yang (IGPP University of California) Xiao Bi Xie (IGPP University of California) Mingqiu Luo (Screen Imaging Technology, Inc.) Shengwen Jin (Screen Imaging Technology, Inc.) 2008.

Latiff-2014 Seismic Illumination Analysis in Poor Oil & Gas Field Data by Using Focal Beam Method Universiti Teknologi PETRONAS, Ipoh, Malaysia A H Abdul Latiff, D P Ghosh, Z Z Tuan Harith 2014.

Vasconcelos-2008 Imaging internal multiples from subsalt VSP data—Examples of target-oriented interferometry Ivan Vasconcelos, Roel Snieder, and Brian Hornby 2008.

Cao-2008 Local-angle domain illumination for full-wave propagators Department of Earth and Planetary Sciences/IGPP, University of California, Santa Cruz Jun Cao and Ru-Shan Wu 2008.

Jia-2009 Calculation of the wave propagation angle in complex media: application to turning wave Simulations Modeling and Imaging Laboratory, Institute of Geophysics and Planetary Physics, University of California, Santa Cruz, CA 95064, USA. Xiaofeng Jia and Ru-Shan Wu 2009.

vanVeldhuizen—Acquisition geometry analysis in complex 3D E. J. van Veldhuizen, G Blacquière, and A. J. 2008.

Liu-2011 An effective imaging condition for reverse-time migration using wavefield decomposition Faqi Liu, Guanquan Zhang, Scott A. Morton and Jacques P. Leveille 2011.

Letki-2013 Illumination Analysis from Coil Survey Design and Acquisition to Coil Processing Solution WesternGeco L P Letki, A menari, E Zamboni, S Tchikanha 2013.

V. Cerveny, et al.,—"Fresnel volume ray tracing" Geophysics, Society of Exploration Geophysicists, US. vol. 57, No. 7, Jul. 1, 1992 pp. 902-915.

PCT Notification of Transmittal of the International Search Report and the Written Opinion of the International Searching Authority, or the Declaration, dated Aug. 4, 2015, 13 pages.

* cited by examiner

SYSTEMS AND METHODS EMPLOYING UPWARD BEAM PROPAGATION FOR TARGET-ORIENTED SEISMIC IMAGING

CROSS-REFERENCE TO RELATED APPLICATIONS

This application claims priority to U.S. Provisional Patent Application 62/036,910, filed 13 Aug. 2014 and titled "System and Method for Target-Oriented Seismic Imaging" by inventors Chaoshun Hu and Uwe K. Albertin. The foregoing application is hereby incorporated herein in its entirety.

STATEMENT REGARDING FEDERALLY SPONSORED RESEARCH OR DEVELOPMENT

Not applicable.

FIELD OF THE INVENTION

The present invention relates generally to methods and systems for seismic imaging of the Earth's subsurface and, in particular, methods and systems for target-oriented reverse time migration of seismic data to identify hydrocarbon reservoirs.

BACKGROUND OF THE INVENTION

Scientists and engineers often employ geophysical surveys for exploration and engineering projects. Geophysical surveys can provide information about underground structures, including formation boundaries, rock types, and the presence or absence of fluid reservoirs. Such information greatly aids searches for water, geothermal reservoirs, and mineral deposits such as hydrocarbons and ores. Oil companies in particular often invest in extensive seismic and electromagnetic surveys to select sites for exploratory oil wells.

Geophysical surveys can be performed on land or in water using active seismic sources such as air guns, vibrator units, or explosives, to generate seismic waves, and further using receivers such as hydrophones or geophones, to detect reflections of such waves from subsurface structures. The process is repeated with many different source positions and optionally with different receiver positions. The arrangement of sources and receivers may be customized to achieve adequate coverage of the region of interest while facilitating processing of the acquired data.

The acquired seismic data is recorded and processed to provide a seismic image that may be used to identify subterranean features of interest. Seismic imaging methods include ray-based methods (such as Kirchhoff migration), wave-equation based methods (such as one-way imaging or two-way, reverse-time migration, imaging), and beam propagation-based methods (such as Gaussian beam migration). In general, ray-based seismic imaging methods are relatively computationally cheap but tend to have difficulty imaging complex subsurface features while wave-equation methods are more accurate, but computationally expensive. (The computational burden associated with reverse time migration makes it generally impractical for use in iterative imaging or velocity inversion.) Beam propagation-based methods tend to fall in between ray-based methods and wave-equation based methods in computational cost and accuracy.

Regardless of the imaging method employed, measurement noise can obscure the subsurface structures, particularly when wide-azimuth all-shots-based inversion is performed. To combat noise accumulation resulting from inclusion of a large number of shots having little or no information about a particular region of interest, the analyst may employ "target-oriented imaging", a inversion method based on only those shot traces that are suitably selected or weighted by their relevance to the target region rather than including the full set of data. While this method may dramatically reduce the volume of seismic data being inverted and thereby reduce the computational burden, existing techniques for performing the selection or weighting may themselves be computationally intensive.

SUMMARY OF THE INVENTION

Accordingly, described herein are implementations of various approaches for a computer-implemented method employing upward beam propagation for target-oriented seismic imaging of a subsurface volume of interest. The disclosed embodiments include at least:

EMBODIMENT A

A computer-implemented method for processing seismic data representative of a subsurface volume of interest, the method including: obtaining, at a computer processor, a seismic dataset and a geologic model representative of the subsurface volume of interest; identifying a target based on the seismic dataset and the geologic model; calculating a normal to represent a structural dip direction for at least one point on the target; upward propagating, via the computer processor, a cluster of beams from the at least one point on the target to a surface representing an acquisition surface of the seismic data; identifying valid source-receiver beam pairs based on coverage of the seismic dataset; accumulating, via the computer processor, coverage of the valid source-receiver beam pairs; identifying traces from the seismic dataset that fall within the accumulated beam pair coverage; and performing, via the computer processor, a target-oriented reverse time migration using the identified traces to produce a seismic image.

EMBODIMENT B

A system for processing seismic data representative of a subsurface volume of interest, the system including: a data source, a computer processor, and a user interface. The data source contains a seismic dataset and a geologic model. The computer processor executes computer modules that include: a target module for identifying a target; a beam module for upward propagating beams; a seismic trace module for identifying traces; and a reverse time migration module for performing a target-oriented reverse time migration using the identified traces. The target model may facilitate user identification of a target via the user interface, and may further calculate a normal to represent structural dip direction for at least one point in the target. The beam module may identify valid source-receiver beam pairs based on coverage of the seismic dataset, and may further accumulate coverage of the source-receiver beam pairs.

EMBODIMENT C

An article of manufacture including a non-transitory computer readable medium having computer readable code on it, the computer readable code being configured to implement a method of Embodiment A for processing seismic data.

Each of the foregoing embodiments may further include any one or more of the following features in any combination. Feature 1: the seismic image is stored in a nontransient information storage medium. Feature 2: a visual representation of the seismic image is displayed. Feature 3: the seismic image is used to identify a hydrocarbon reservoir. Feature 4: the upward beam propagation employs a Gaussian beam algorithm. Feature 5: the geologic model is derived from the seismic dataset. Feature 6: the geologic model includes seismic horizons within the subsurface volume of interest. Feature 7: the calculation of a normal includes finding a tangent plane to a seismic horizon nearest at least one point in the target. Feature 8: the accumulated beam-pair coverage is weighted based on accumulated beam energy, and wherein traces are identified as being within the accumulated beam-pair coverage if the weight at the trace location exceeds a predetermined threshold. Feature 9: the seismic dataset is organized into shot gathers, and the identification of traces is performed as separate parallelizable tasks that each include iterating through the traces of a given shot gather. Feature 10: the seismic dataset is organized into offset gathers, and wherein the identification of traces is performed as separate parallelizable tasks that each include iterating through the traces of a given offset gather.

The above summary section is provided to introduce a selection of concepts in a simplified form that are further described below in the detailed description section. The summary is not intended to identify any essential or key elements of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, claims and accompanying drawings where:

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION OF THE INVENTION

Figure 1:
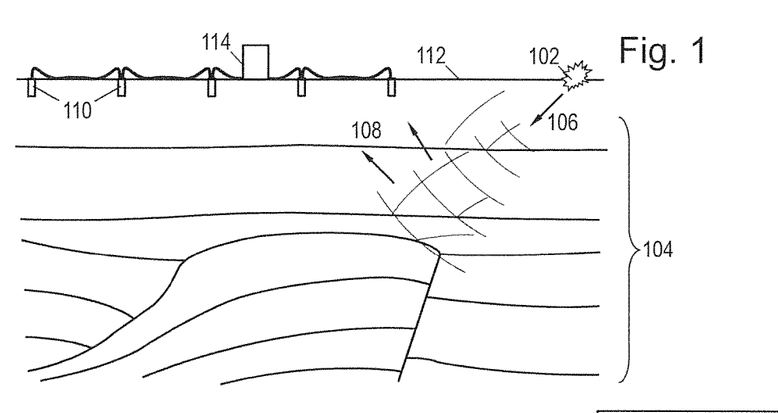
FIG. 1 is a schematic depiction of an illustrative seismic survey.

To put the disclosed upward-beam-propagation-based implementations of target-oriented seismic imaging systems and methods in context, it is useful to understand how seismic imaging is performed. It begins with a seismic survey, which can be performed on land or in water. As indicated in FIG. 1, an energy source 102 near the region of interest 104 generates seismic waves 106 that propagate into the region of interest and reflect from internal features such as bed boundaries. Eventually the reflected waves 108 reach an array of receivers 110 on the surface 112. A recording system 114 captures the received signals for storage and processing. The process is repeated with many different source positions and optionally with different receiver positions.

Figure 2:
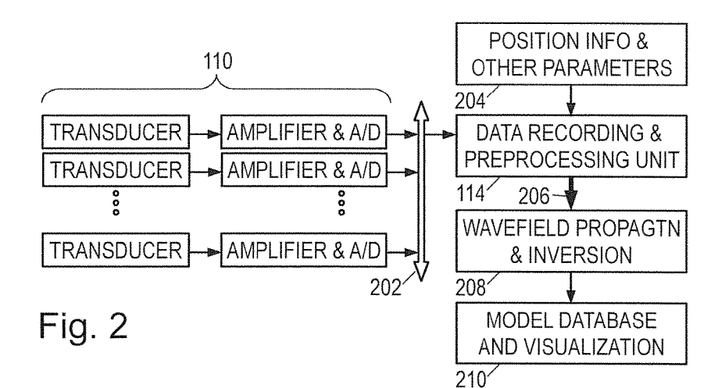
FIG. 2 is a block diagram of an illustrative subsurface imaging system.
Figure 3:
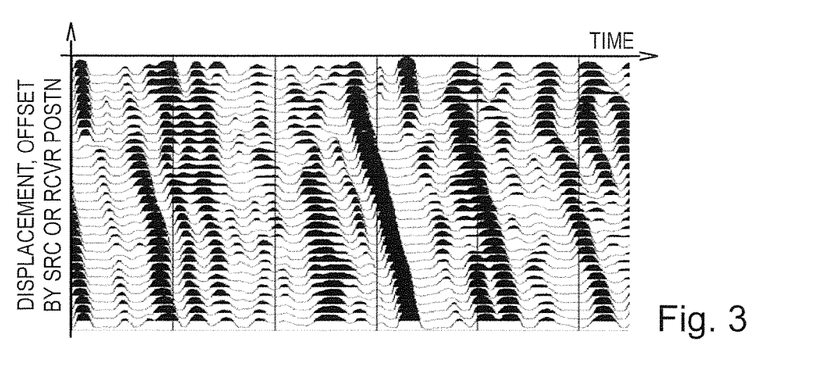
FIG. 3 is a graph of an illustrative seismic gather.

As indicated in FIG. 2, the array of seismic receivers 110 converts the seismic waves to electrical signals that are amplified and digitized. FIG. 3 shows an illustrative set of signal waveforms, each waveform representing displacement, velocity, acceleration, pressure, or some other wave attribute, detected by a given receiver as a function of time after the corresponding shot. (Waveforms associated with specified source and receiver positions may be referred to herein as "traces", and collections of multiple traces may be referred to herein as "gathers".) To make the individual waveforms legible, the waveform for each receiver is offset from the next, with the positive-valued portions of the waveform filled in and the negative-valued portions shown as a bare line. If each of the waveforms shown correspond to the same firing of the source, the set of traces is termed a "shot gather". If each of the waveforms is obtained by a receiver at the same offset from the shot location, the set of traces is termed an "offset gather". (Offset gathers are common in marine seismic surveys having the source and the receiver array towed by the same boat, as a given receiver is always at the same offset from the source.) Alternatively, it is possible to create synthetic seismic data using a computer to forward model seismic propagation from virtual sources to virtual receivers.

Returning to FIG. 2, a recording system 114 collects the digitized signals via a bus 202 or other communications pathway and stores the digitized signals on an information storage medium for later processing. Typically, each digitized signal is associated with parameters 204 such as a receiver location and a shot location and such other information as the system designer deems worthwhile. Recording system 114 may perform some initial processing to filter and/or compress the data, and in at least some cases, to perform quality control.

The recording system 114 provides the seismic survey data via the Internet or some other communications mechanism 206 to a data processing center 208 having sufficient computational resources for the imaging process. The data processing center includes one or more computers that may use target-oriented seismic imaging methods to convert the recorded seismic signals into a three dimensional map or "image" of the subsurface structure which can be stored in a model database 210 or other persistent storage that supports rendering of visual representations for display.

To simulate the wave field and construct the image, the data processing center models the region of interest as a three-dimensional space divided into an orthogonal grid of cells. The properties of all of the points within a cell are assumed to be uniform. Typically, the imaging process yields for each cell some measure of reflectivity or coherence, from which the boundaries between the various stratigraphic layers can be extracted. Properties for each layer can be refined and augmented with further analysis, which may include processing to extract velocity, dispersion, and angular dependence of the propagating seismic energy. Additional sources of information (such as well logs, simulations, and stratigraphic interpretation) may also be exploited to measure, extrapolate, or otherwise estimate properties of each cell.

Figure 4A:
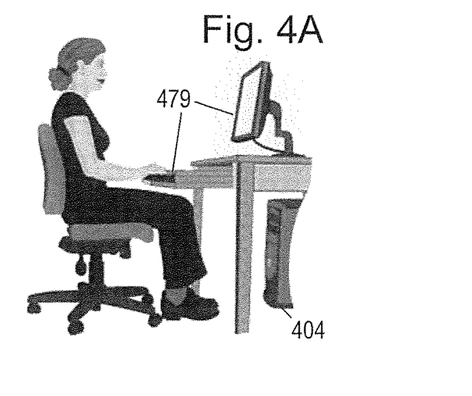
FIG. 4A is a contextual view showing illustrative usage of the imaging system.

As shown in FIG. 4A, an analyst employs a user interface 479 of a workstation 404 to control the seismic imaging process and to view and analyze the resulting seismic images. The workstation 404 is part of the hardware platform of a seismic imaging system such as that shown in FIG. 4B. The illustrative hardware platform couples the workstation 404 to one or more multi-processor computers 406 via a local area network (LAN) 405. The one or more multi-processor computers 406 are in turn coupled via a storage area network (SAN) 408 to one or more shared storage units 410. Using the personal workstation 404, the analyst is able to load seismic survey data into the system, to configure and monitor the processing of the seismic survey data and to retrieve the resulting volumetric seismic images from the system, optionally in the form of two-dimensional cross-sections.

Figure 4B:
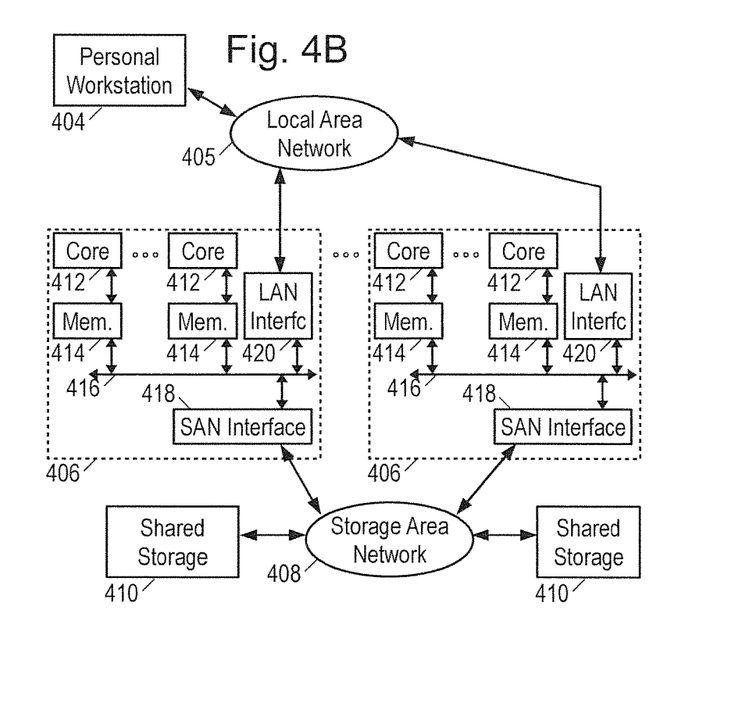
FIG. 4B is a block diagram of an illustrative hardware platform suitable for imaging.

Personal workstation 404 may take the form of a desktop computer with a display that shows graphical representations of the input and result data, and with a keyboard that enables the user to move files and execute processing software. LAN 405 provides high-speed communication between multi-processor computers 406 and with personal workstation 404. The LAN 405 may take the form of an Ethernet network.

Multi-processor computer(s) 406 provide parallel processing capability to enable suitably prompt processing of the input data to derive the results data. Each computer 406 includes multiple processors 412, distributed memory 414, an internal bus 416, a SAN interface 418, and a LAN interface 420. Each processor 412 operates on allocated tasks to solve a portion of the overall imaging problem and contribute to at least a portion of the overall results. Associated with each processor 412 is a distributed memory module 414 that stores application software and a working data set for the processor's use. Internal bus 416 provides inter-processor communication and communication to the SAN or LAN networks via the corresponding interfaces 418, 420. Communication between processors in different computers 406 can be provided by LAN 405.

SAN 408 provides high-speed access to shared storage devices 410. The SAN 408 may take the form of, e.g., a Fibrechannel or Infiniband network. Shared storage units 410 may be large, stand-alone information storage units that employ magnetic disk media for nonvolatile data storage. To improve data access speed and reliability, the shared storage units 410 may be configured as a redundant disk array ("RAID").

Figure 4C:
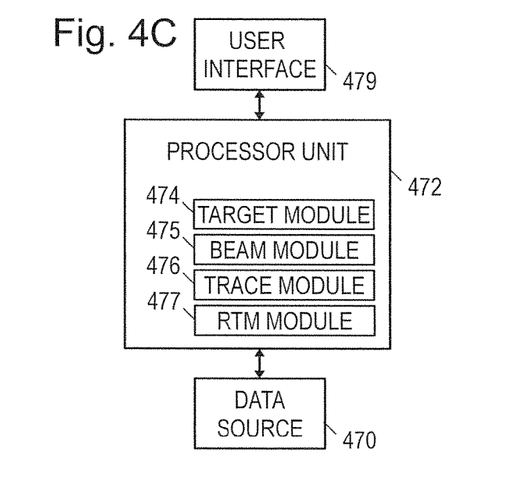
FIG. 4C is a block diagram of an illustrative computer-based imaging method implementation.

It is the software that configures the hardware platform to operate as a target-oriented seismic imaging system with upward beam propagation. FIG. 4C recasts the hardware platform into functional blocks, with data source 470 representing the persistent storage systems 408, 410, and processor unit 472 representing a composite of the workstation 404 and multi-processor computers 406 interconnected via LAN 405. Various software modules 474-477 are shown as resident on the composite processing unit 472. The mapping of software modules to memories, cores, and other components of the hardware platform is a task efficiently handled by the operating system's built in scheduler process. The allocated module tasks may be executed in a serial and parallel fashion to carry out the methods and processes disclosed herein.

Target module 474 facilitates the identification of target regions and extraction of the structural dip and normal directions. Beam module 475 performs upward beam propagation from points in the target region. Seismic trace module 476 performs selection and/or weighting of traces in accordance with the method of FIG. 7. RTM module 477 performs reverse time migration or some other suitable imaging operation based on the selected/weighted shot traces from module 476. Additional modules may be included, such as an interpretation module for identifying hydrocarbon reservoirs or other subsurface geologic features. The user interface 479 may be used both to display data and processed data products and to allow the user to select among options for implementing aspects of the method. By way of example and not limitation, the input seismic data and the seismic image computed on the processor unit 472 may be displayed on the user interface 479, stored on the data storage device or memory 470, or both displayed and stored.

The modules may be implemented by one or more proprietary or commercially available software packages installed on the hardware platform to facilitate the desired functionality. They may take the form of user-authored scripts, workflows, or other programming mechanisms for customizing the operation of the software and automating these operations for target-oriented seismic imaging. Examples of commercially available software that supports the use of such user programming include Paradigm's GOCAD software, which supports the use of TCL ("Tool Command Language") or CLI ("Command Language Interface), and Schlumberger's Petrel software, which includes a Process Manager for authoring workflows. Both software packages support the use of plug-ins that can be authored in traditional programming languages such as C++. Nevertheless, the implementation of the following methods is not limited to any specific software language or execution environment.

Figure 5A:
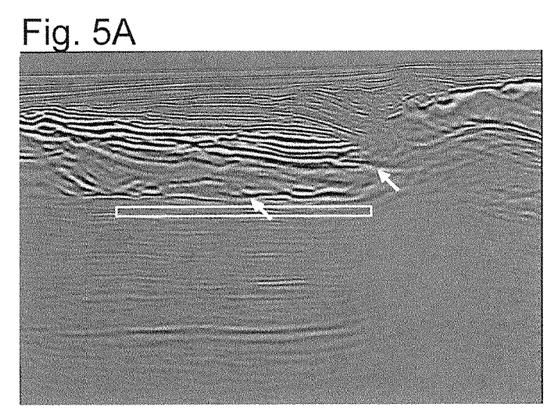
FIG. 5A is an illustrative crossline section of a seismic image volume.
Figure 5B:
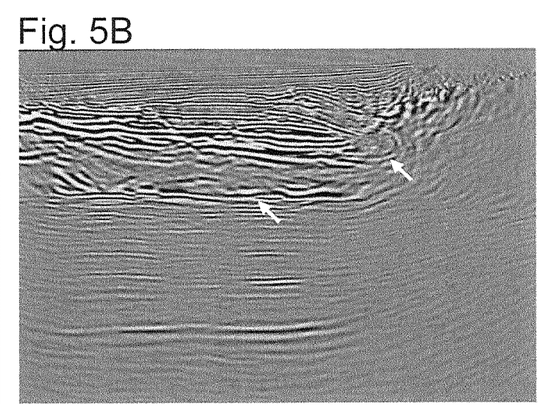
FIG. 5B is the crossline section after target-oriented seismic imaging.
Figure 6A:
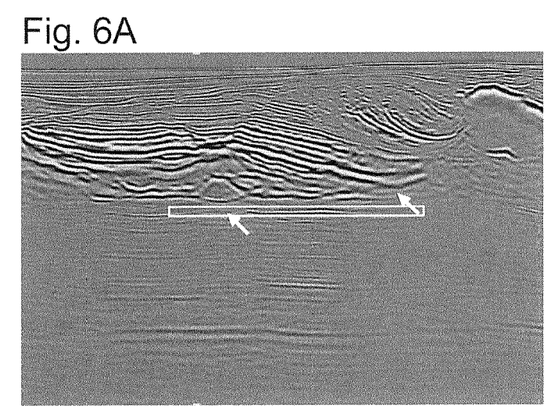
FIG. 6A is an illustrative inline section of the seismic image volume.

FIGS. 5A and 6A show crossline and inline sections of a subsurface image volume that has been derived from seismic survey data by a seismic imaging system. The illustrated images were derived using wide-azimuth all-shots based reverse time migration, but any imaging technique may be employed to obtain an initial image to serve as a starting point. Interpretation of these initial images suggests the presence of a salt body having certain boundary details (indicated by arrows) that are poorly defined or otherwise suspect. After selecting a section of an interpreted horizon (enclosed within the box) as a target and applying the following upward-beam propagation based target-oriented seismic imaging method, the suspect details become more clearly defined as shown in the crossline and inline sections shown in FIGS. 5B and 6B, respectively. As salt bodies often host hydrocarbon reservoirs, such details may be important to determining whether and how to drill an exploratory well.

Figure 7:
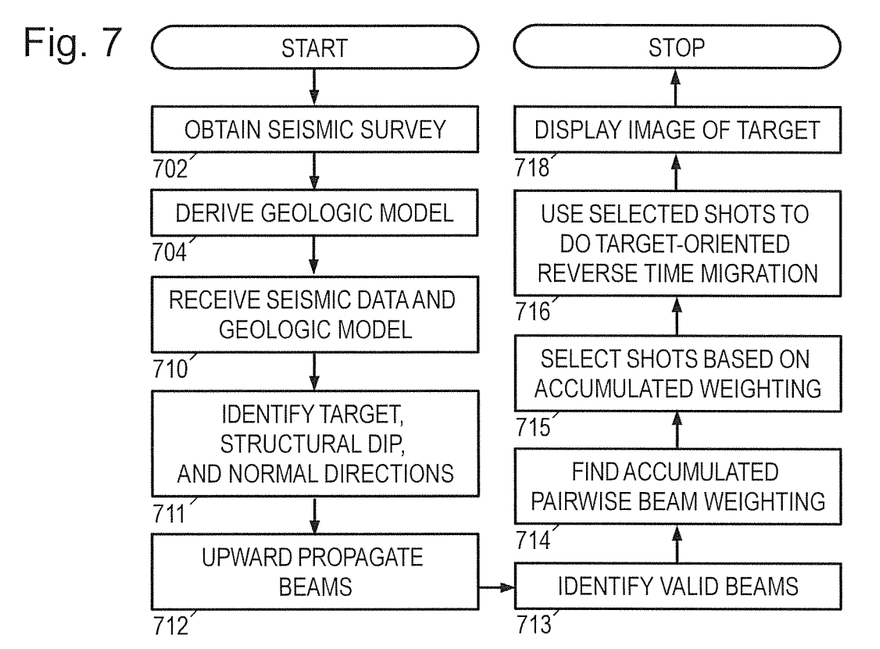
FIG. 7 is a flow diagram of an illustrative seismic imaging method.

FIG. 7 is a flow diagram of an illustrative upward-beam propagation based seismic imaging method that may be at least partly embodied as a user-authored script, workflow, program, plugin, or other executable unit and implemented by the system of FIGS. 4A-4C. The various blocks may represent individual software modules, though in some embodiments multiple blocks may be implemented as a single module. Moreover, the illustrated implementation sequence may vary and/or certain modules may operate in parallel to carry out the disclosed techniques.

In block 702, the system obtains or otherwise establishes access to the a seismic survey database. In block 704 the system derives a seismic image of the subsurface volume, preferably also extracting seismic horizons and geobodies to serve as an initial geologic model. The geologic model may also or alternatively include a velocity model. The seismic image and geologic model may be stored in the database or other persistent storage for later analysis. In block 710, the system obtains or otherwise establishes access to the seismic survey database and the seismic image or geologic model to enable guided processing and interpretation by an analyst. In block 711, the system facilitates selection of a target. In theory, the target can be any subset of the model or imaged volume. In practice, the target is expected to be in or near the region of particular interest. Smaller targets will require less processing, while larger targets will reduce the likelihood of overlooking nearby influences. The target selection may be accomplished by enclosing the desired target region within a bounding box or selecting specific horizons or geobodies. If desired, multiple related or unrelated targets may be simultaneously selected, though such multiple selections are hereafter treated as a single collective target.

Figure 8A:
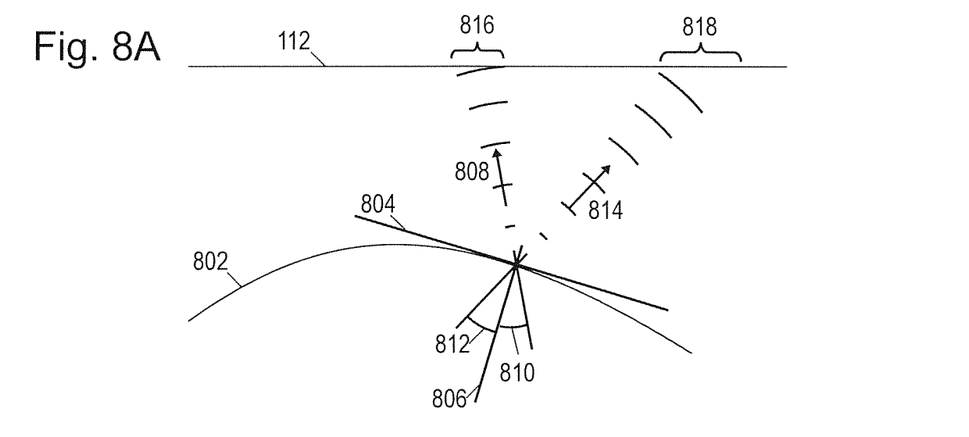
FIG. 8A is a schematic depiction of an illustrative upward beam propagation.

Also in block 711, the system automatically performs structural dip analysis of the target to extract dip direction information. Such dip information can be derived from the target itself (e.g., if it is a seismic horizon) or from seismic horizons in the vicinity of the target. The dip information is commonly expressed as a position-dependent normal vector. Referring momentarily to FIG. 8A and taking horizon 802 as the target, the system in essence derives a tangent 804 to each position along the horizon 802. The tangent 804 is conveniently represented by a perpendicular unit ("normal") vector 806. One benefit of using the normal vector is the ease of enforcing equality between incidence angle and reflection angles 810, 812 (discussed further below).

In block 712 (FIG. 7), the system performs upward beam propagation from each of multiple points evenly distributed throughout the target. Beams differ from rays in several ways. Beams have a width, which may be thought of as a partial wavefront that generally becomes broader as the beam moves away from its source. In the upward propagation, the beam source is at a point of interest in the target volume and propagates based on the structural dip and normal direction. A cluster of beams may be propagated in a variety of azimuth directions and a variety of offsets or opening angles for a plurality of points of interest.

Referring again to FIG. 8A, the system propagates a Gaussian beam 808 along an incidence direction 810 toward a potential source region 816 on acquisition surface 112. (In some embodiments, the acquisition surface is placed at the same depth level as the actual receivers in the seismic dataset.) Assuming an equal reflection angle 812 relative to the normal vector 806, the system then propagates a Gaussian beam 814 toward a potential receiver region 818 on acquisition surface 112. The simplified depiction in FIG. 8A omits many of the intermediate formation layers and velocity variations that would be typical of a realistic formation and which would affect the propagation paths of the beams 808, 814, but Gaussian beam propagation is known in the art and further implementation details can be found in, e.g., Cerveny et al., 1982. Each beam covers a range of angles or offsets, and multiple beams are employed in a pairwise fashion to cover the full range of possible incidence/reflection angles at each azimuth. It should be noted that the geometry enables the source region 816 and receiver region 818 to be interchanged without affecting the beam propagation paths, and this symmetry can be exploited to halve the computational burden.

Figure 8B:
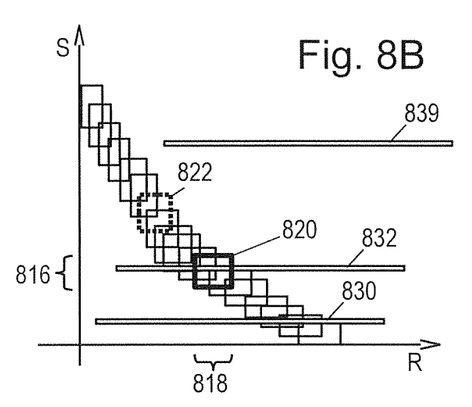
FIG. 8B is a graph comparing accumulated areal coverage to selected shot gathers.

In general, regions 816, 818 are two-dimensional, but for explanatory purposes consider a situation where the source and receiver positions are constrained to the one horizontal dimension represented in FIG. 8A. The pairwise correspondence of regions 816, 818 can then be represented by a rectangle 820 as shown in FIG. 8B. The potential source region 816 is the range shown along the source position axis S, and the potential receiver region 818 is the range shown along the receiver position axis R. Due to the aforementioned symmetry, a symmetrically-located rectangle 822 represents the pairwise correspondence with source and receiver regions interchanged. With the propagation of other beams from the selected point on the target, additional pairwise region correspondences can be mapped out as shown by the other rectangles in FIG. 8B. Due to the Gaussian cross-section of the beams, the rectangles do not represent uniform distributions of beam energy. Rather, each rectangle tends to be more heavily weighted in the middle and less heavily weighted near the periphery. (Due to the long tails of Gaussian distributions, a cutoff value may be employed to enable affirmative delimiting of the potential regions.) As the process is repeated for other points throughout the target, additional rectangles may be added to the pairwise correspondence graph.

Figure 8C:
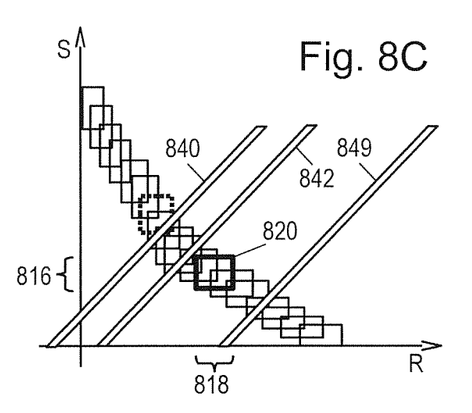
FIG. 8C is a graph comparing accumulated areal coverage to selected offset gathers.

Note that the rectangles represent potential pairwise combinations of source and receiver position. In practice, such regions may often occur outside the range of the seismic survey. For example, in FIG. 8B line 830 may represent the source-receiver correspondences of a first shot gather and line 839 may represent the source-receiver correspondences of a last shot gather, the two of them enclosing a correspondence region for the survey including correspondences for multiple intermediate gathers such as shot gather 832. Those rectangles that fail to overlap with any of the shot gathers may be discarded as invalid. A similar observation holds for FIG. 8C, in which a marine-type seismic survey correspondence region is represented by a first offset gather 840 and a last offset gather 849, with line 842 representing one of many intermediate offset gathers. Those rectangles which fail to overlap any of the offset gathers may be discarded as invalid. It may be further noted that each gather represents many different traces, and those traces falling outside the rectangles can be similarly discarded. When the two-dimensional nature of regions 816, 818 are considered, the pairwise correspondences of FIGS. 8B-8C can only be considered in four dimensions, but the illustrated principles remain the same.

Refer again to FIG. 7 with the foregoing principles in mind. The upward propagation of beams in block 712 defines the pairwise correspondences of the potential source and receiver regions and the weighting that should be associated with any traces satisfying such correspondences for the given target points. In block 713, the system identifies those beam correspondences that overlap the survey correspondence region as valid. The non-overlapping beam correspondences are discarded.

As previously mentioned, the propagated beams have an initially Gaussian energy distribution that may be redistributed by the propagation process to the acquisition surface 112. The system tracks the energy distribution within each source-receiver region correspondence space revealed by the pairwise upward beam propagations of block 712 and, in block 714, accumulates the amplitude or energy distributions for each beam pair correspondence from each point in the target region. The accumulated energy distributions serve as weighting values for evaluating the importance of the information obtainable from matching traces.

In block 715, the system iterates through each of the seismic survey traces, gather by gather, to compare the source-receiver positions of each trace with the accumulated energy distributions in correspondence space. Those shot traces having a source-receiver position correspondence with sufficient weighting are selected for use in the next imaging operation, while the remaining traces are omitted from the target-oriented imaging operation. In block 716, the system performs an imaging operation with the selected shot traces. In at least some embodiments, the system employs reverse time migration (RTM) for this imaging operation. Regardless of the selected imaging procedure, it may be expected to be performed relatively quickly because the selected shot traces are expected to be a relatively small subset of the overall survey, e.g., less than 10%. The image information derived from the migration of each gather can be optionally weighted in accordance with the associated trace weights. In block 718, the system stores the resulting seismic image and optionally renders a visual representation of the target region, which expectedly demonstrates enhanced image definition relative to the initial image of block 704.

It is noted that the operations of blocks 712-714 are readily parallelizable, e.g., when working in either common-offset or shot-domain. For a common-offset type setting, the beam propagation can be performed in parallel offset by offset. For a shot-domain implementation, the beam propagation can be performed in parallel shot by shot.

Figure 6B:
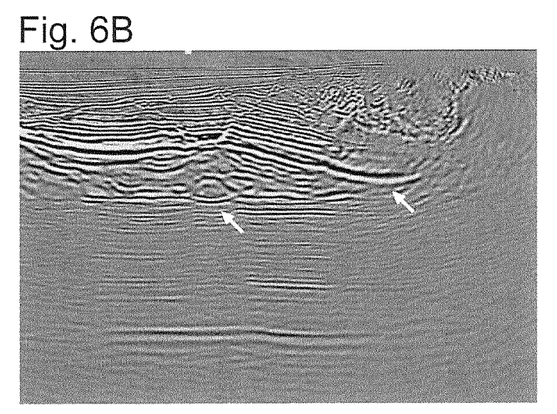
FIG. 6B is the inline section after target-oriented seismic imaging.

Due to the reduced number of shots, the target-oriented RTM will require less time to perform than an RTM using all possible shots. In some cases, the target-oriented RTM will run in a matter of hours, making iterative imaging or velocity inversion possible. Since the RTM is target-oriented, it is designed to provide the best imaging in the target volume while imaging away from the target volume may suffer. For example, FIGS. 5A and 6A show the result of Gaussian Beam migration. Although these images are high quality in most areas across the section, they do suffer in the areas indicated by the arrows where the reflectors have been distorted due to a salt body. Since salt makes a good trap for hydrocarbons, these are often the areas where it is most desirable to have a good image. FIGS. 5B and 6B show the seismic image after the target-oriented RTM of method 100. Note the improvement in reflector continuity and focusing at the arrows. However, since the target volume of interest was around those arrows, the imaging in other areas such as the right side of the images has suffered.

The invention can be implemented in numerous ways, including, for example, as a system (including a computer processing system), a method (including a computer implemented method), an apparatus, a computer readable medium, a computer program product, a graphical user interface, a web portal, or a data structure tangibly fixed in a computer readable memory. The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms, environments, and architectures. It will be appreciated that the scope and underlying principles of the present invention are not limited to any particular computer software technology. Also, an article of manufacture for use with a computer processor, such as a CD, pre-recorded disk or other equivalent devices, may include a tangible computer program storage medium and program means recorded thereon for directing the computer processor to facilitate the implementation and practice of the present invention. Such devices and articles of manufacture also fall within the scope of the present invention.

Moreover, those skilled in the art will appreciate that the present invention may be practiced using any one or combination of hardware and software configurations, including but not limited to a system having single and/or multiple processor computers, hand-held devices, tablet devices, programmable consumer electronics, mini-computers, mainframe computers, and the like. The invention may also be practiced in distributed computing environments where tasks are performed by servers or other processing devices that are linked through one or more data communications network. In a distributed computing environment, program modules may be located in both local and remote computer storage media including memory storage devices.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method for processing seismic data representative of a subsurface volume of interest, the method comprising:
   a. obtaining, at a computer processor, a seismic dataset and a geologic model representative of the subsurface volume of interest;
   b. identifying a target based on the seismic dataset and the geologic model;
   c. calculating a normal to represent a structural dip direction for at least one point on the target;
   d. upward propagating, via the computer processor, a cluster of beams from the at least one point on the target to a surface representing an acquisition surface of the seismic data wherein the normal is used to enforce equality between incidence angles and reflection angles of the cluster of beams;
   e. identifying valid source-receiver beam pairs that overlap shot gathers of the seismic dataset;
   f. accumulating, via the computer processor, coverage of the valid source-receiver beam pairs;
   g. identifying traces from the seismic dataset that fall within the accumulated beam pair coverage; and h. performing, via the computer processor, a target-oriented reverse time migration using the identified traces to produce a seismic image.

2. The method of claim 1 further comprising using the seismic image to identify a hydrocarbon reservoir.

3. The method of claim 1 wherein the upward propagating uses a Gaussian beam algorithm.

4. The method of claim 1, wherein said obtaining includes deriving the geologic model from the seismic dataset, the geologic model representing seismic horizons within the subsurface volume of interest.

5. The method of claim 4, wherein said calculating a normal includes finding a tangent plane to a seismic horizon nearest the at least one point.

6. The method of claim 1, wherein each beam in the cluster of beams is initially directed at a corresponding range of angles relative to the normal.

7. The method of claim 1, wherein the accumulated beam-pair coverage is weighted based on accumulated beam energy, and wherein traces are identified as being within the accumulated beam-pair coverage if the weight at the trace location exceeds a predetermined threshold.

8. The method of claim 1, further comprising storing the seismic image in a nontransient information storage medium; and displaying a visual representation of the seismic image.

9. The method of claim 1, wherein the seismic dataset is organized into shot gathers, and wherein said identifying is performed as separate parallelizable tasks that each include iterating through the traces of a given shot gather.

10. The method of claim 1, wherein the seismic dataset is organized into offset gathers, and wherein said identifying is performed as separate parallelizable tasks that each include iterating through the traces of a given offset gather.

11. An article of manufacture including a non-transitory computer readable medium having computer readable code on it, the computer readable code being configured to implement a method for processing seismic data, the method comprising:

a. obtaining, at a computer processor, a seismic dataset and a geologic model representative of the subsurface volume of interest;

b. identifying a target based on the seismic dataset and the geologic model;

c. calculating a normal to represent a structural dip direction for at least one point on the target;

d. upward propagating, via the computer processor, a cluster of beams from the at least one point on the target to a surface representing an acquisition surface of the seismic data wherein the normal is used to enforce equality between incidence angles and reflection angles of the cluster of beams;

e. identifying valid source-receiver beam pairs that overlap shot gathers of the seismic dataset;

f. accumulating, via the computer processor, coverage of the valid source-receiver beam pairs;

g. identifying traces from the seismic dataset that fall within the accumulated beam pair coverage; and h. performing, via the computer processor, a target-oriented reverse time migration using the identified traces to produce a seismic image.

12. The article of claim 11, wherein the accumulated beam-pair coverage is weighted based on accumulated beam energy, and wherein traces are identified as being within the accumulated beam-pair coverage if the weight at the trace location exceeds a predetermined threshold.

13. The article of claim 11, wherein the method further comprises: storing the seismic image in a nontransient information storage medium; and displaying a visual representation of the seismic image.

14. The article of claim 11, wherein the seismic dataset is organized into shot gathers, and wherein said identifying is performed as separate parallelizable tasks that each include iterating through the traces of a given shot gather.

* * * * *